United States Patent [19]

Stemme et al.

[11] 4,256,392
[45] Mar. 17, 1981

[54] SELF-DEVELOPING CAMERA

[75] Inventors: Otto Stemme, Munich; Frank Staudacher, Haan, both of Fed. Rep. of Germany

[73] Assignee: AGFA-Gevaert, A.G., Leverkusen, Fed. Rep. of Germany

[21] Appl. No.: 70,844

[22] Filed: Aug. 29, 1979

[30] Foreign Application Priority Data

Sep. 1, 1978 [DE] Fed. Rep. of Germany ....... 2838286

[51] Int. Cl.³ .............................................. G03B 17/52
[52] U.S. Cl. ..................................... 354/86; 354/288
[58] Field of Search ................................. 354/83–86, 354/210, 288, 354; 150/52 J; 206/578, 316, 455, 469, 606

[56] References Cited

U.S. PATENT DOCUMENTS

| 1,366,158 | 1/1921 | Brown | 354/288 X |
| 2,477,304 | 7/1949 | Land | 354/83 X |
| 2,612,092 | 9/1952 | Heyer et al. | 354/288 X |
| 4,068,244 | 1/1978 | Douglas | 354/85 |
| 4,109,264 | 8/1978 | Pizzuti et al. | 354/288 |
| 4,117,501 | 9/1978 | Peck | 354/288 X |
| 4,162,833 | 7/1979 | Plummer | 354/210 |

Primary Examiner—John Gonzales
Attorney, Agent, or Firm—Michael J. Striker

[57] ABSTRACT

A self-developing camera has a box-camera type housing in which there is room to store one or more spare film packs. The housing requires an absolute minimum of packaging for storage, transportation and sale.

14 Claims, 4 Drawing Figures

SELF-DEVELOPING CAMERA

BACKGROUND OF THE INVENTION

This invention relates to a self-developing camera, i.e. to the type of camera sometimes known as "instant picture cameras".

Such cameras are marketed by several makers and in a variety of models ranging from the simple to the sophisticated. The simpler (inexpensive) models usually have a rigid (non-collapsible) housing which, although it tapers forwardly (toward the lens) in a conical or pyramidal configuration, is quite large and bulky. For storage and transportation such cameras must, of course, be accommodated in appropriate packages which are necessarily even larger and bulkier than the cameras themselves. The result is that the consumer purchases a large, bulky package which only in part consists of the camera (i.e. the part which he intends to purchase), whereas a substantial part is constituted by the packaging materials (which are of no value to him but for which he, of course, must pay anyhow). If the packaging expenses could be reduced then, clearly, the overall cost to the consumer could be reduced. On the other hand, it is not possible to completely dispense with packaging because it serves to protect the camera and, in any case, consumers expect their purchase to be merchandised in an attractive package.

Another problem with self-developing cameras is that they require something of an adaptation on the part of those who have either no experience in photography or else those who are used to conventional photography. Beginners, in either sense, usually purchase inexpensive models of the camera; since self-developing film packs are comparatively expensive such buyers will frequently purchase only a single film pack to go with their new camera. Naturally, as with all beginning enterprises, the user can expect to make errors so that not all of the pictures in the first film pack will be satisfactory. If, therefore, the user judges results only on the basis of the ones obtained with the first and only film pack he has purchased, he may conclude that this type of photography is too expensive and may discontinue all further efforts at improving his techniques.

The two considerations outlined above can be related to one another, in the sense that if the expenditures for packaging of the camera could be reduced the resulting savings could be passed on to the consumer in the form of spare film packs, to be included as part of the initial camera purchase but without increasing the overall camera price. This would enable the purchaser to experiment sufficiently with his new camera to overcome the usual beginner's mistakes—without having to lay out funds for the purchase of additional films during this period.

SUMMARY OF THE INVENTION

It is, accordingly, an object of the present invention to overcome the disadvantages of the prior art, and to achieve the advantages outlined above.

A more particular object is to provide a self-developing camera which requires a minimum of packaging.

Still another object is to provide such a camera which is particularly inexpensive to produce.

A concomitant object is to provide a camera of the type in question which has, within its housing, space for the storage of spare film packs, e.g. film packs which are delivered to the buyer as a part of his purchase.

In keeping with the above objects, and with still others which will become apparent hereafter, the invention resides in a self-developing camera of the type having a housing including a front part provided with a lens, and a shutter, and a rear part which is provided with a film-pack holding and transporting mechanism. The improvement according to the invention comprises, in one aspect thereof, the use of an intermediate housing part which connects the front and rear parts to one another and which has an interior of which at least a portion is so dimensioned as to accommodate and store one or more spare film packs, i.e. one or more film packs in addition to a film pack which is installed in the camera in picture-taking position.

The basic shape of the camera according to the invention is that of a box camera, i.e. a camera shape which has been proven satisfactory all over the world in the many millions of such cameras which have been sold over the years. Box cameras are sturdy and require hardly any packaging at all, thus permitting significant savings in the expense of packaging which can be passed on to the purchaser in the form of spare film packs without having to raise the selling price of the camera. In a camera according to the invention the interior of the housing is largely available for the storage of such spare film packs—contrary to rollfilm-type box cameras—because the holding arrangement for the film pack which is in picture-taking position, and the mechanism for advancing the exposed sheets, are arranged adjacent the rear wall of the camera and thus constitute no interference. A camera of this type can be produced and sold quite inexpensively, the more so as it is intended for beginners in self-developing photography and can, therefore, be provided with a simple and low-cost lens and shutter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
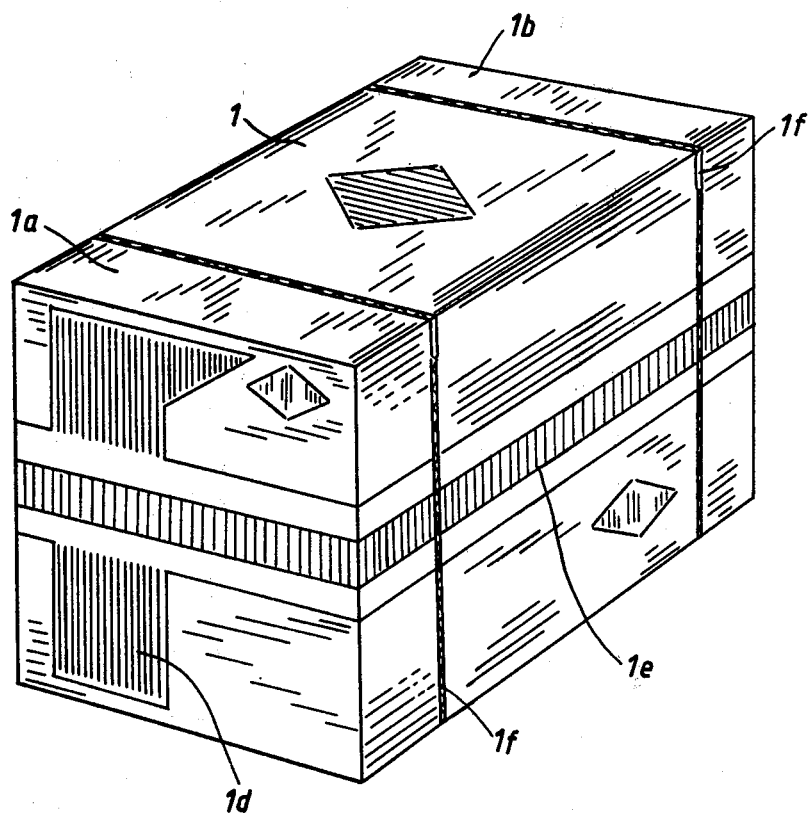
FIG. 1 is a perspective view, showing the camera according to the invention in its point-of-sale condition.

A camera according to the invention is shown in FIG. 1 in its "point-of-sale" condition, i.e. packaged for storage and for sale to the consumer. The entire assembly is essentially a quadratic box having a surface of a heavy grade of printed cardboard or a similar material. The intermediate part 1 (tubus) of the camera is exposed; the front and rear parts 2, 3 (see FIG. 2) are concealed and protected beneath covers 1c and 1b, respectively. These covers are connected with the intermediate part at lines of perforations or similar weakened zones, or e.g. tear strips similar to those found in cigarette packages to open up their outer cellophane overwrap. Along these weakened zones, or via the tear strips, the covers 1c, 1b are detachable from the camera.

The endface 1d of the cover 1a and/or of the cover 1b may carry information about the content of the package, e.g. a type designation of the camera and/or information of the types and quantities of film packs in the camera. The lateral surface areas 1e (one visible) preferably carry only details relating to the camera itself. The inner surfaces of the covers 1a and 1b become visible when the covers are detached from the camera (FIG. 2) and may carry printed instructions 1c on the use of the camera.

Figure 2:
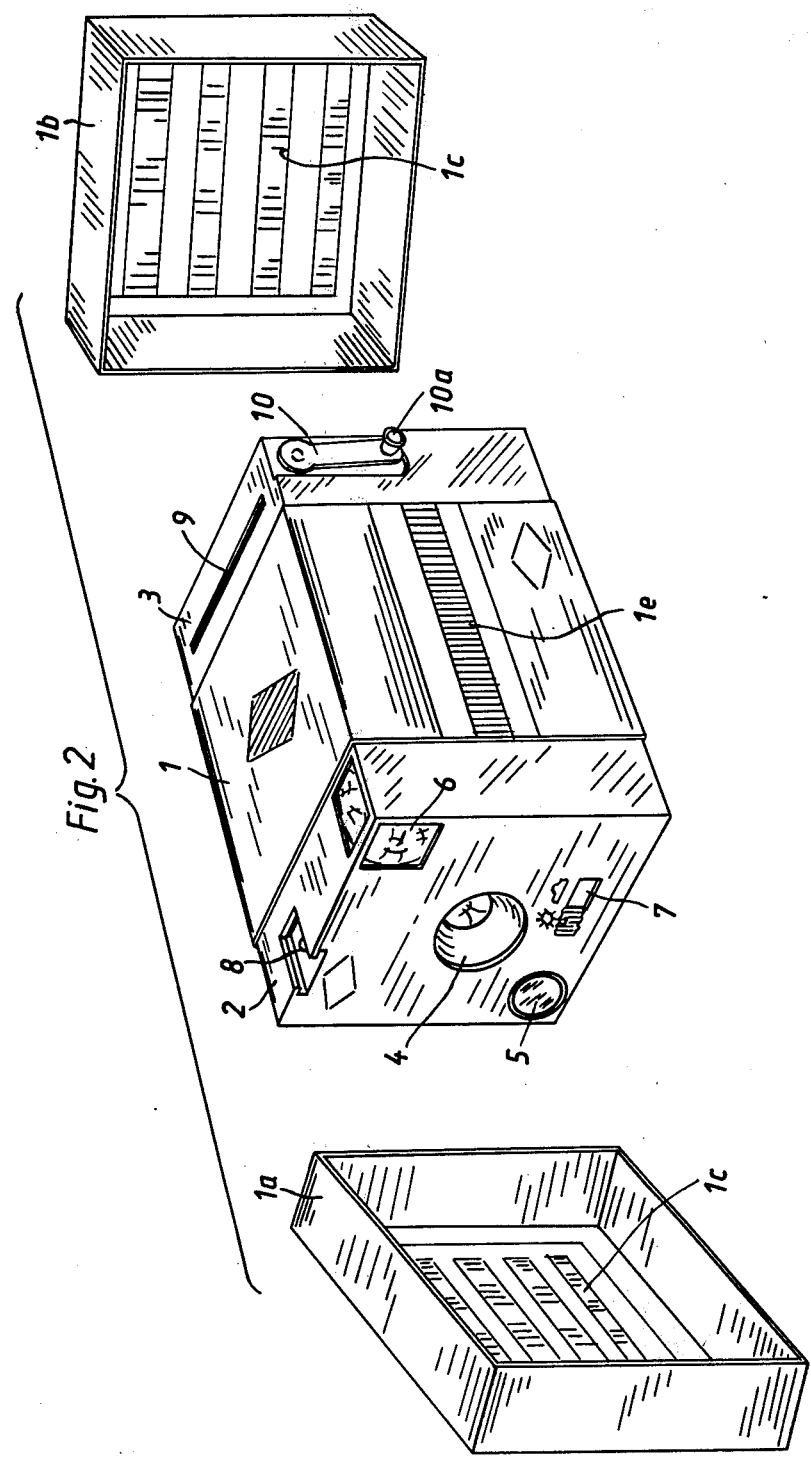
FIG. 2 is an exploded view, showing the camera of FIG. 1 with its packaging removed.
Figure 3:
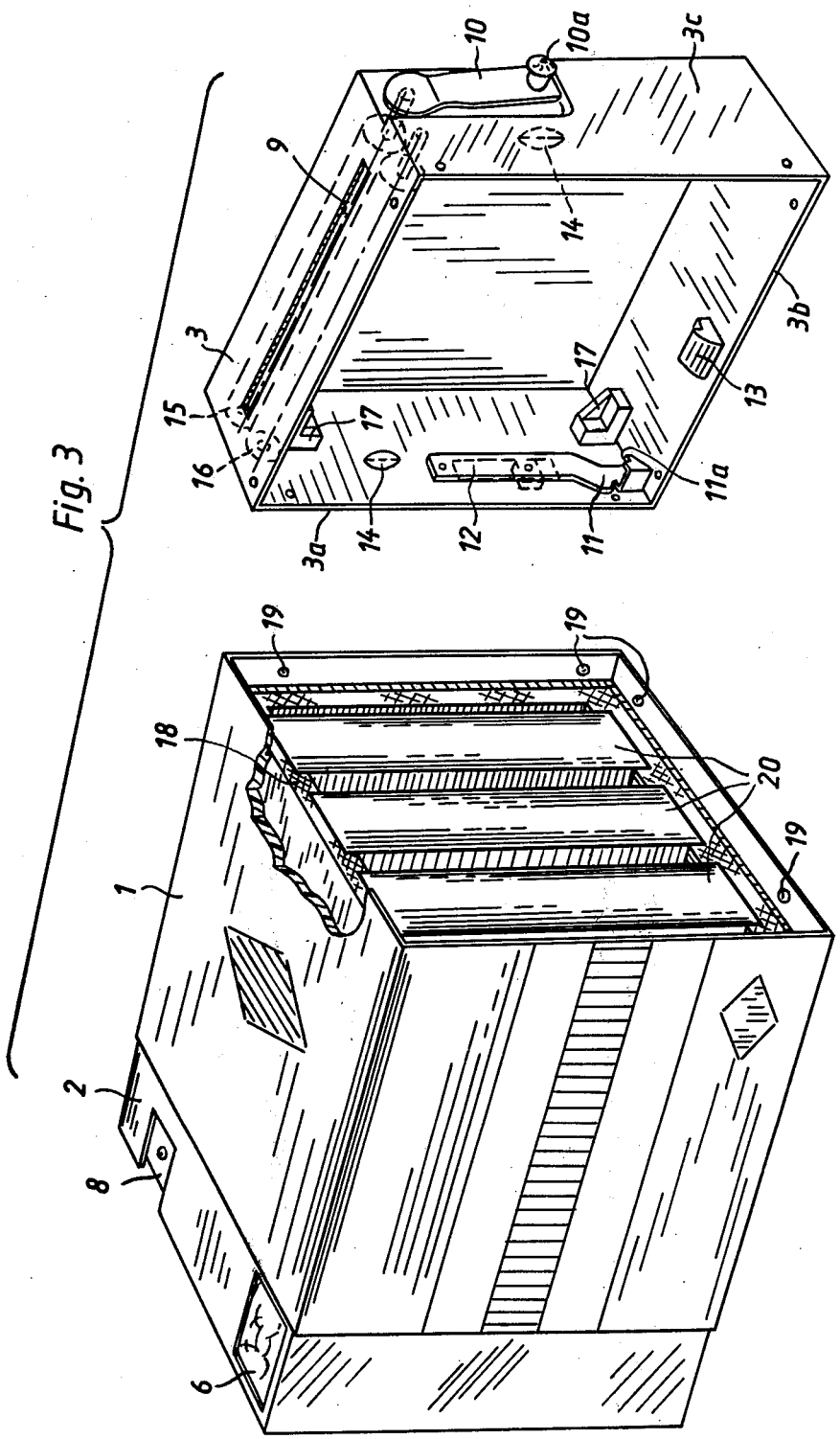
FIG. 3 is another exploded view, but showing the camera itself disassembled.

As FIGS. 2 and 3 show, the camera itself is basically a box-type camera having the intermediate part 1 to which are connected the front part 2 and the rear part 3. Mounted in the front part 2 are the lens 4 and a (not illustrated) shutter; it may also have a simple diaphragm, release 5 and viewfinder 6. None of these elements form part of the inventive aspects; they are all well known per se and will therefore not be described in further detail. The same is true with a shoe 8 by means of which a flash unit may be mounted on the camera, and a two-position operator 7 which allows the user to set the camera for two different exposure times or diaphragm apertures.

The rear part 3 of the camera has an outlet slot 9 through which exposed film sheets are expelled from the camera. It is also provided with a crank 10 connected to a pair of known-per-se nip rollers 15, 16 (FIG. 3) which transport the respectively exposed film sheet and distribute developer from the developer pouch of the sheet over the picture area of the sheet. Crank 10 may have a retractable handle 10a which, in the retracted position, serves to arrest the crank.

FIG. 3 shows details of the camera interior. It will be seen that the portion 1 is provided, on oppositely located inner surfaces thereof, with ribs 18 which hold packaged film packs 20.

Front part 2 and rear part 3 may be of synthetic plastic material (e.g. PVC, PET, styrene) and are preferably made by injection molding. Rear part 3 is provided with abutments 17 which engage an inserted film pack to orient it in picture-taking position. To hold such a film pack in place the walls 3a and 3c which are elastically yieldable, are provided with inner projections 13, 14. To insert a film pack, it is pushed into the rear part 3 until it engages the abutments; the walls 3a and 3c yield and the projections frictionally retain the film pack. To release the same, e.g. when all film sheets have been used, it is merely necessary to deflect walls 3a, 3c outwardly away from one another.

One of the walls, here the wall 3a, is formed with a slot 12 at the inside of which is located a slide 11 which overlies the slot and prevents the entry of light. A portion of the slide 11 extends to the exterior where it can be gripped by the fingers of a user to move the slide 11. A free end of slide 11 carries a gripper 11a which, when slide 11 is moved lengthwise of the slot 12, engages the respectively uppermost (exposed) film sheet of a film pack in part 3 and pushes it out of the film pack into the nip of rollers 15, 16. These rollers may be of an inexpensive synthetic plastic (e.g. PVC, PET) since a particularly long lifetime is not expected of them. The crank 10 is connected to one of the rollers 15, 16 (here roller 15) to turn the same. Handle or knob 10a can be pulled out (as shown in FIGS. 2 and 3) when the crank is to be turned, and retracted (pushed in) when the crank is not in use, in which case it may enter into a recess of part 3 (not shown) to arrest the crank 10. Evidently, the crank 10 may be replaced by some other simple means for rotating one of the nip rollers, e.g. a pull strap or a rack slide.

Figure 4:
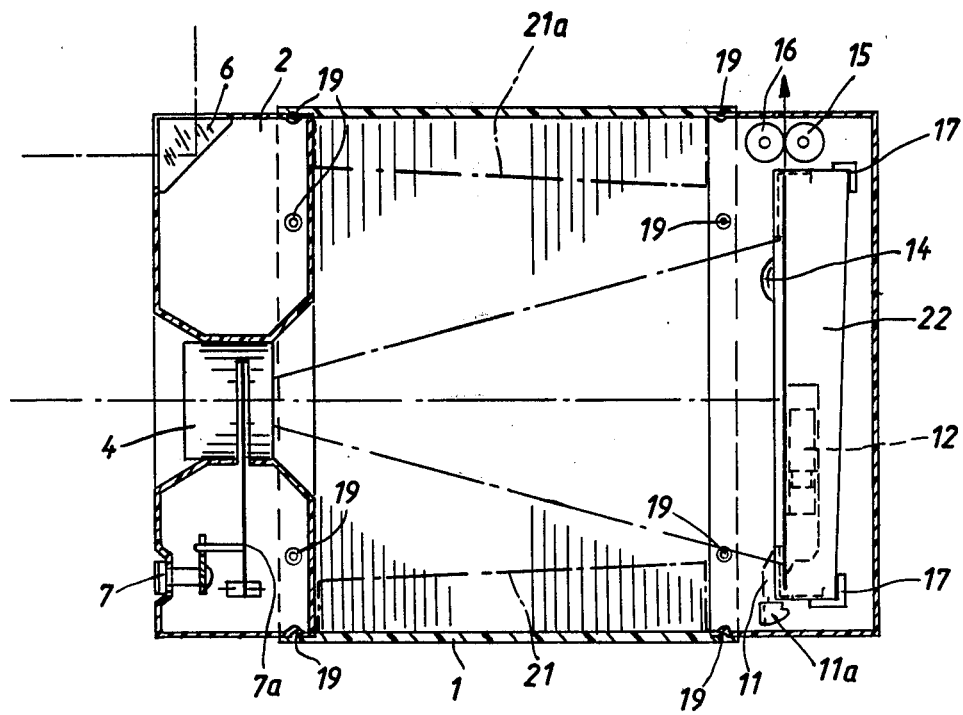
FIG. 4 is a vertical longitudinal section through the camera of FIG. 3 in condition ready for picture-taking.

The camera discussed with reference to the preceding Figures is shown in FIG. 4 in readiness for use. A film pack 22 is installed in part 3 in picture-taking position. The part 3 is partially inserted into the open rear end of the intermediate part 1, and retained therein by the snap-action entry of projections 19 on the inner surfaces of part 1 into holes (or just depressions) in the sidewalls of part 3.

In this position the uppermost film sheet in the film pack 22 (i.e. in FIG. 4 the film sheet—not shown—which is farthest left) is located in the imaging plane of the lens 4 so that, when the shutter 7a is operated, this film sheet is exposed with scene light. Thereafter the user moves the slide 11 up, causing gripper 11c to push the exposed film sheet out of the film pack 22 and into the nip of rollers 15, 16. The user knows when the upper (leading) edge enters the nip because he encounters resistance to further movement of the slide 11. He now turns the crank 10 clockwise, whereby the film sheet is transported through the nip of rollers 15, 16 and its developer squeezed from the storage pouch and distributed over the picture area, as is known per se. The film sheet is expelled through slot 9 and ready for viewing upon completion of its development. Thereafter the user returns slide 11 to its starting position.

In addition to achieving the objects outlined earlier, the camera according to the invention has the virtue of being almost fool-proof in operation. Should the user forget to return the slide 11 to its starting position, the lack of action when he seeks to transport the next film sheet will immediately call this to his attention. Should he turn the crank 10 before using slide 11 to move the exposed film sheet, the rollers 15, 16 will simply idle. Advantageously, the gripping portion of slide 11 may be recessed into the outer surface of part 3 and shiftable only under simultaneous inwardly directed pressure; this prevents accidental movements of slide 11.

The spare film packs supplied along with the camera need by no means be stored in the camera in their packages. They may equally well be unpacked and stored in this condition in the camera. If, for example, three film packs 21, 21a and 22 are provided, all three may be stored in unpacked condition, or the packs 21, 21a may be so stored and the pack 22 installed (as shown) in readiness for picture taking. When the pack 22 is used up (leaving only its case) it can be immediately exchanged for one of the packs 21, 21a. Since the space evacuated by the pack 21 or 21a offers itself handily for accommodation of the empty pack 22, the user is encouraged not to discard the empty pack as litter but to take it home and dispose of it properly. The stored spare packs 21, 21a do not interfere with the passage of scene light from lens to film; they are held by means of appropriate grooves or projections on the inner surfaces of part 1.

The part 1 is advantageously of a strong grade of cardboard and painted black in its interior. However, it may also be of cardboard and lined at its interior with black synthetic plastic foil (bonded to the cardboard) which is provided with ribs or projections for retaining the spare film packs.

The invention is susceptible of a variety of modifications without departing from its intent and spirit. For example, fewer than the illustrated three film packs may be stored in and sold with the camera, such as one or two. Again, more than three could be provided since there is sufficient space to store three or four film packs in the part 1 whereas a further fifth such film pack could be placed in the position illustrated for the pack 22 in FIG. 4, so that as many as five could be provided.

While the invention has been illustrated and described as embodied in a self-developing camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-developing camera, comprising a housing, including a front part provided with a lens and shutter, a rear part provided with a film transporting mechanism, and an intermediate part connecting said front and rear parts to one another and having a circumferential wall provided with an inner exposed surface bounding a permanently unobstructed interior through which exposure light travels in a path from said front part to said rear part; first means in said rear part for holding a film pack in picture-taking position in which a film sheet of the film pack is located in the imaging plane of said lens; and second means on said surface for holding at least one spare film pack adjacent said surface away from said path and with no film sheet of the spare pack exposed to imaging.

2. A camera as defined in claim 1; and further comprising a protective cover over at least one of said front and rear parts, and means detachably connecting said cover to said intermediate part so that the cover, while undetached from said intermediate part, constitutes together with said housing a package for storage and transportation.

3. A cameras as defined in claim 2, said cover having an inner side provided with indicia forming camera-operating instructions for a user.

4. A camera as defined in claim 2, wherein at least one of said front and rear parts is of synthetic plastic material.

5. A camera as defined in claim 2, wherein at least one of said front and rear parts is of injection-molded synthetic plastic material.

6. A camera as defined in claim 1; and further comprising means on said front part for connecting a flash unit to said camera.

7. A camera as defined in claim 1, said first means including abutments for the film pack which is in readiness for picture taking operations, and means for retaining the readiness film pack in picture-taking position.

8. A camera as defined in claim 7, said rear part having elastically yieldable sidewalls, and said retaining means being provided on inner surfaces of said sidewalls for snap-engagement with the film pack, said snap-engagement being releasable by resiliently deforming said sidewalls to bring said retaining means out of engagement with said film pack.

9. A camera as defined in claim 1; and further comprising means for releasably coupling said rear part to said intermediate part.

10. A camera as defined in claim 9, said rear part having a portion which is slidably insertable into said intermediate part, and said coupling means coupling said rear and intermediate parts subsequent to such insertion.

11. A camera as defined in claim 1; further comprising means in said rear part for initiating developing of exposed film sheets of the film pack which is in picture-taking position in the camera.

12. A camera as defined in claim 11, said initiating means comprising a slot in a sidewall of said rear part, a slide mounted in said slot for movement therealong while excluding the entry of light, and a gripper on said slide and operative to engage the respectively uppermost film sheet of the film pack which is in picture-taking position, to withdraw the film sheet from the film pack.

13. A camera as defined in claim 1, said rear part having a chamber adapted to accommodate the film pack in picture-taking position, a film discharge slot for expulsion of exposed film sheets of the film pack, a pair of film-sheet transporting and developer-spreading nip rollers inwardly of said slot, and manually operable means coupled to said rollers and accessible outside said rear part to effect rotation of said rollers.

14. A camera as defined in claim 13, said manually operable means being a crank.

* * * * *